US009969372B2

(12) United States Patent
Song

(10) Patent No.: US 9,969,372 B2
(45) Date of Patent: May 15, 2018

(54) HYDRAULIC BRAKE SYSTEM

(71) Applicant: MANDO CORPORATION, Pyeongtaek-si, Gyeonggi-do (KR)

(72) Inventor: Min-Geun Song, Daejeon (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days. days.

(21) Appl. No.: 15/286,351

(22) Filed: Oct. 5, 2016

(65) Prior Publication Data

US 2017/0096131 A1 Apr. 6, 2017

(30) Foreign Application Priority Data

Oct. 5, 2015 (KR) ........................ 10-2015-0139550

(51) Int. Cl.

*B60T 17/04* (2006.01)
*B60T 8/40* (2006.01)
*B60T 8/48* (2006.01)

(52) U.S. Cl.

CPC ........... *B60T 8/4068* (2013.01); *B60T 8/4872* (2013.01)

(58) Field of Classification Search

CPC ............................... B60T 8/4068; F16L 55/04
USPC ............................................................ 303/87
See application file for complete search history.

(56) References Cited

U.S. PATENT DOCUMENTS 5,265,943 A * 11/1993 Kehl ..................... B60T 8/4068 303/113.1
5,379,593 A * 1/1995 Ishiwata ............... B60T 8/4068 60/413
5,632,535 A * 5/1997 Luckevich ............ B60T 8/1766 188/349
5,992,948 A * 11/1999 Gowda ................. B60T 8/4068 303/116.1
2005/0023889 A1* 2/2005 Kondo .................. B60T 8/4068 303/87

FOREIGN PATENT DOCUMENTS

| | | |
|---|---|---|
| DE | 10006895 C1 | 7/2001 |
| DE | 102005028562 A1 | 10/2006 |
| DE | 602004012042 T2 | 3/2009 |
| JP | H05170077 A | 7/1993 |
| KR | 10-2013-0051376 A | 5/2013 |

OTHER PUBLICATIONS

Office Action issued in corresponding German Patent Application No. 102016219314.7, dated Jul. 31, 2017.

* cited by examiner

*Primary Examiner* — Nicholas J Lane
(74) *Attorney, Agent, or Firm* — McDermott Will & Emery LLP

(57) ABSTRACT

Disclosed herein is a hydraulic brake system. The hydraulic brake system comprises a damping device configured to attenuate pressure pulsation of brake oil discharged according to a driving of a pump, wherein the damping device includes a sleeve fixed to a bore that is connected to a discharge end of the pump and having an opened one side, a damping piston slidably installed inside the sleeve, and an elastic member provided inside the sleeve and configured to elastically support the damping piston, and wherein a slot having a width which is varied is formed at an inner circumferential surface of the sleeve in a direction in which the brake oil flows so that a variable orifice is formed between the damping piston and the sleeve.

13 Claims, 10 Drawing Sheets

140
100
103
111
130
110
120
114
101
40
102
123

【Fig. 2】
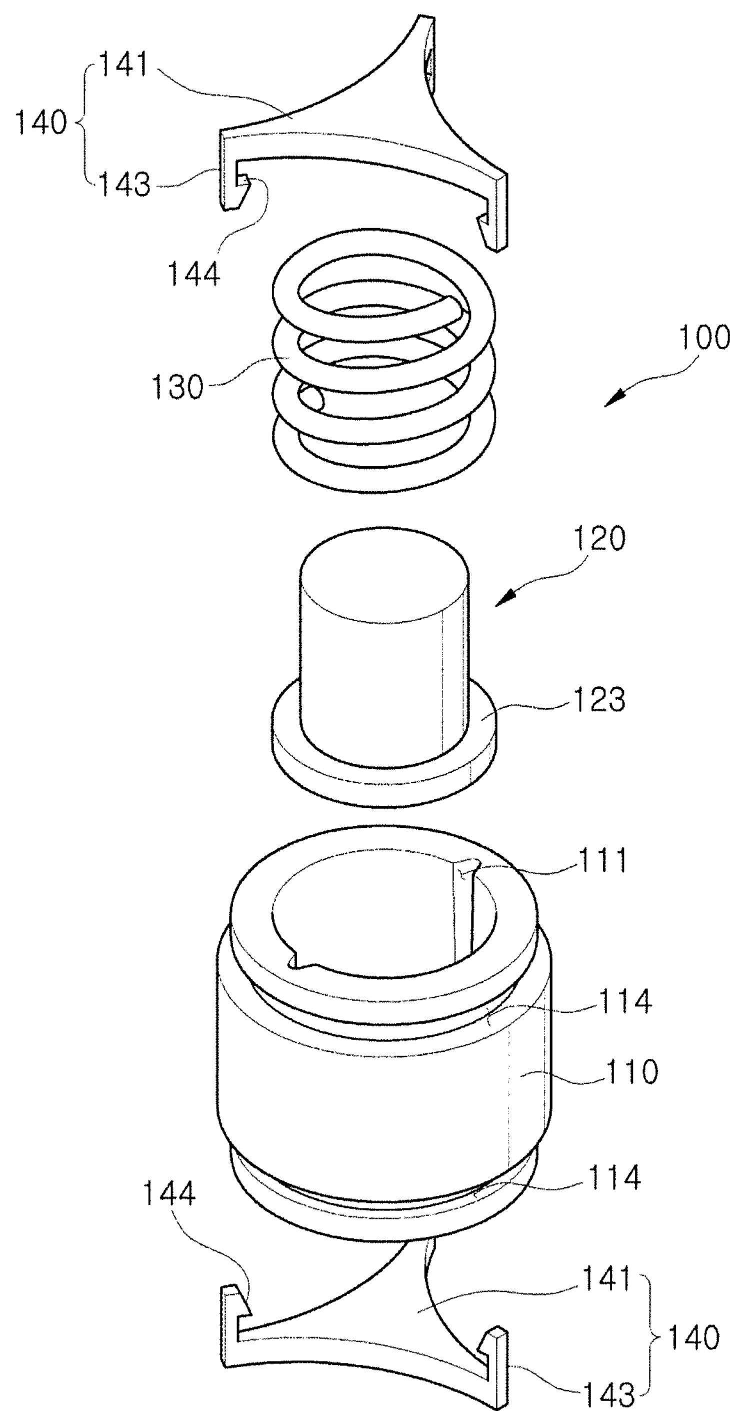

【Fig. 3】
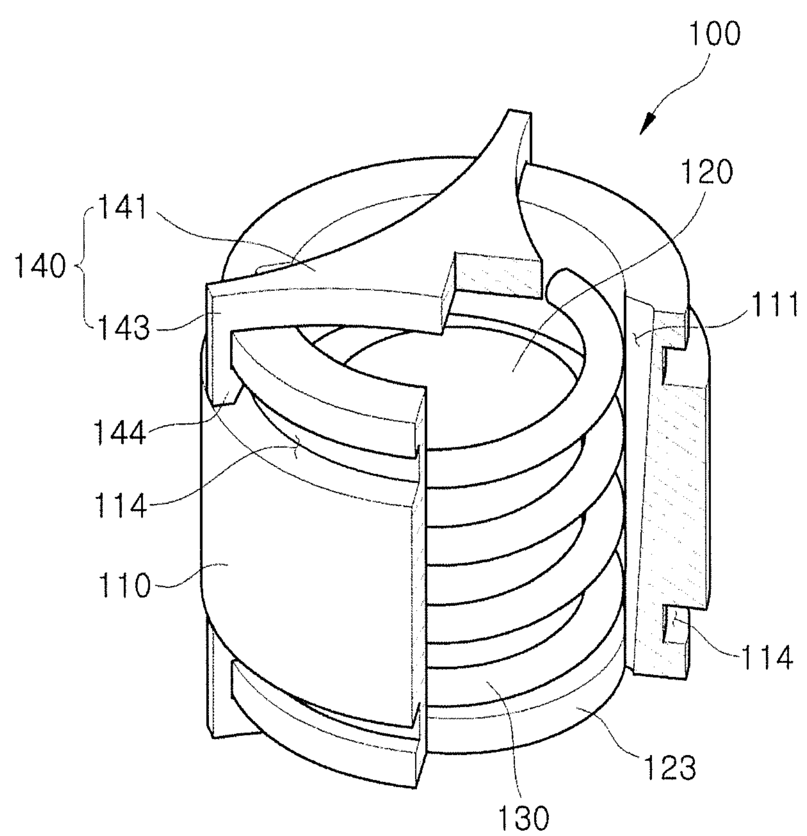

【Fig. 4】
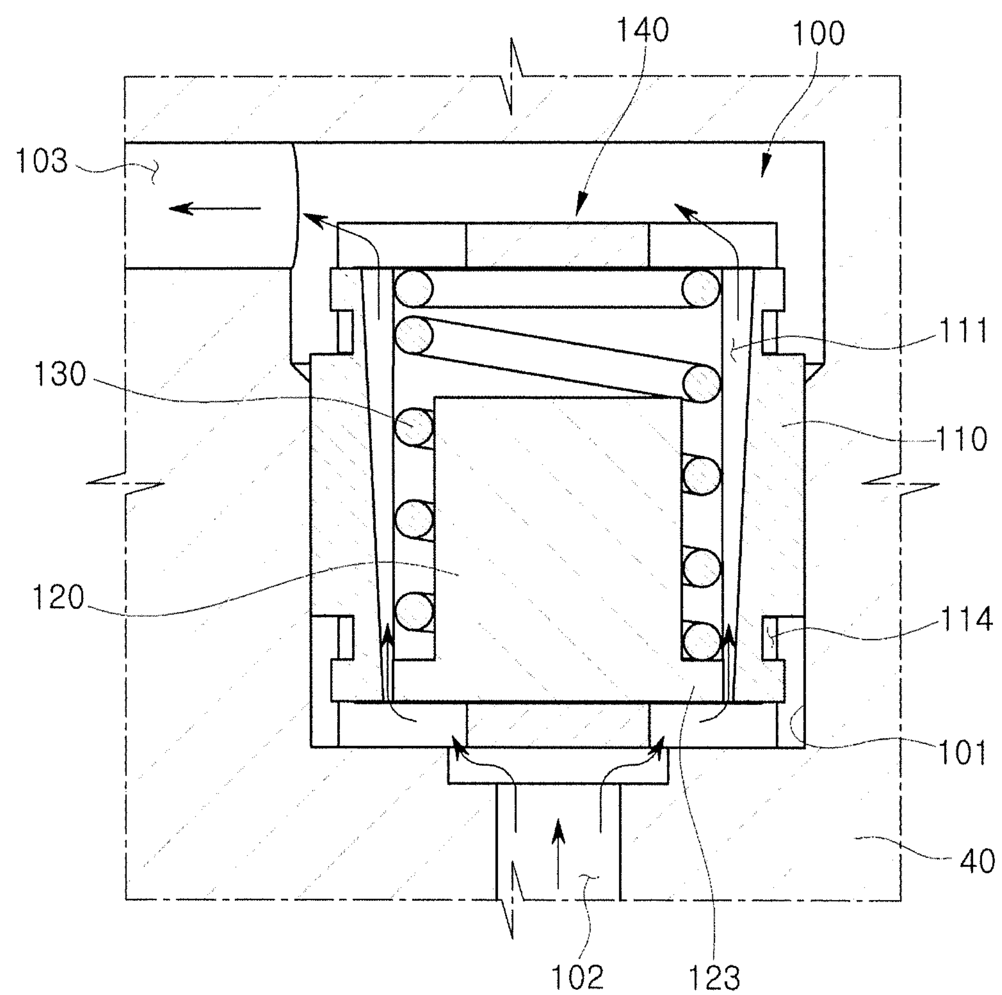

【Fig. 5】
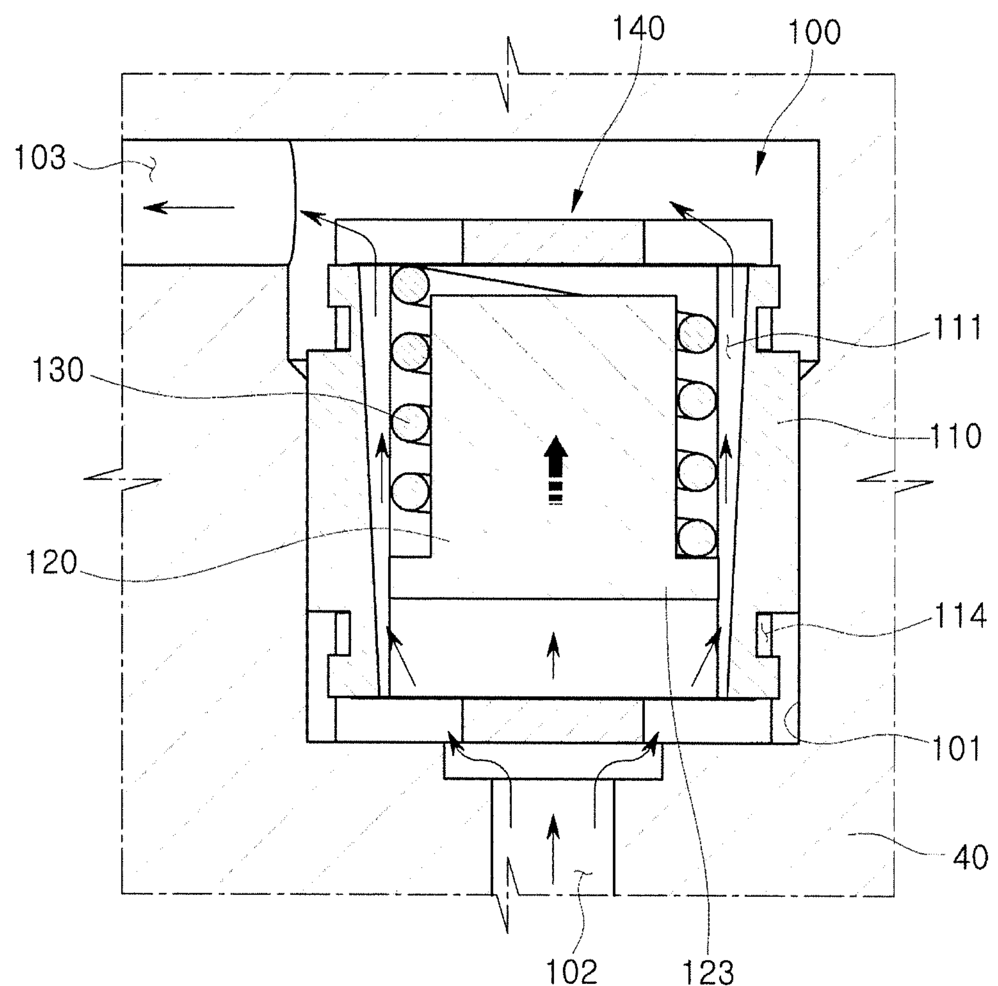

【Fig. 6】
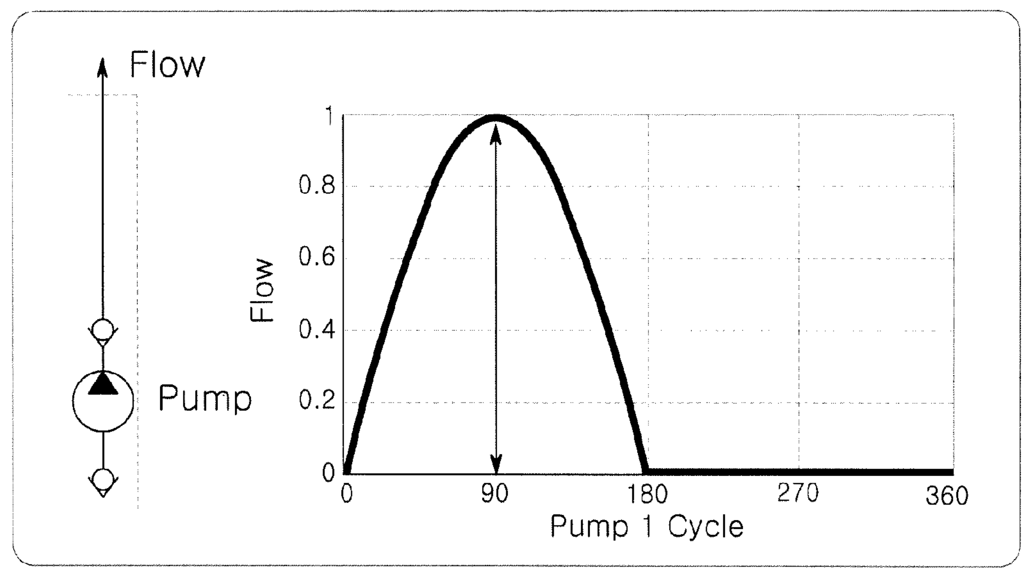
( a )
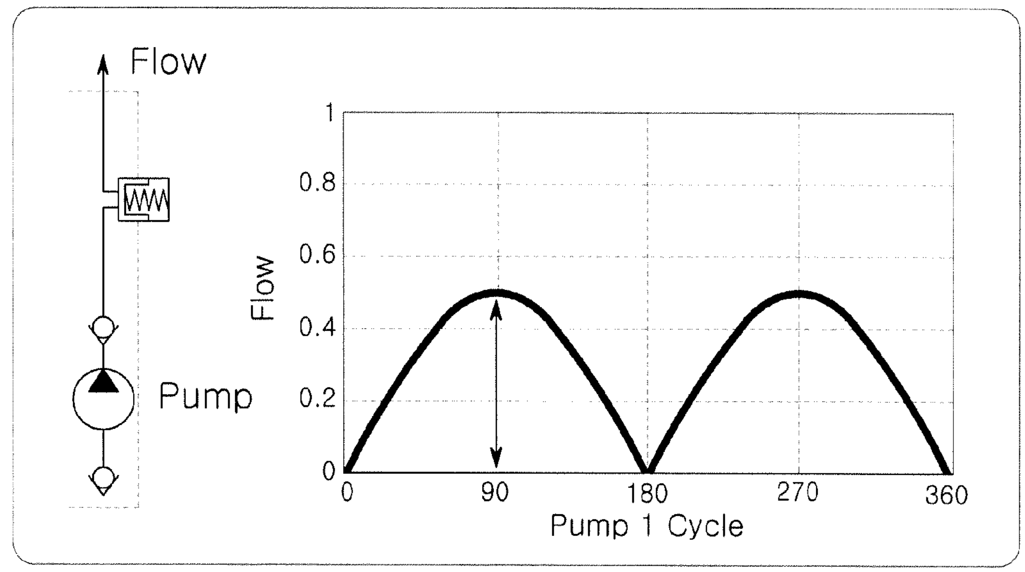
( b )

【Fig. 7】
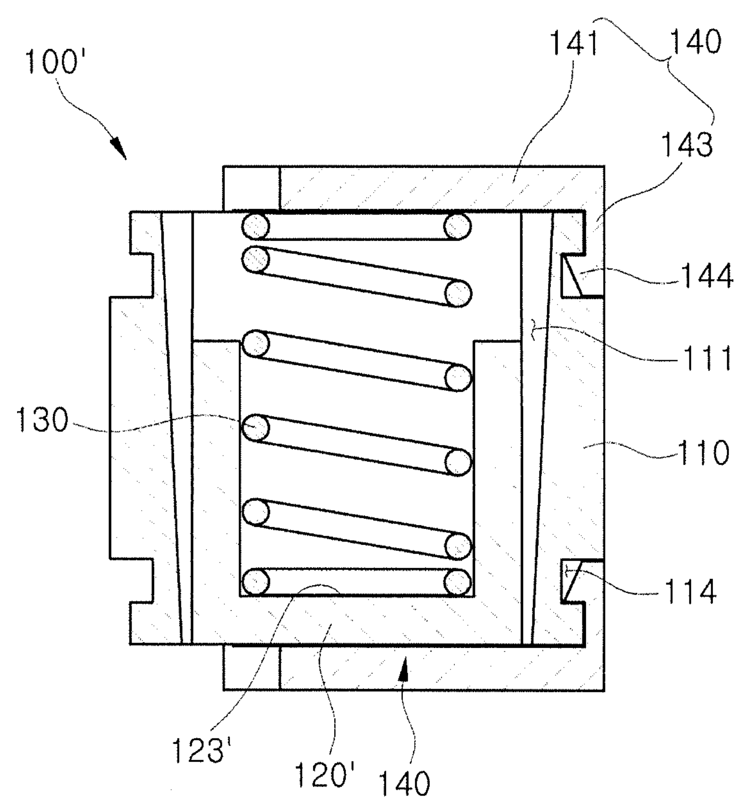

【Fig. 8】
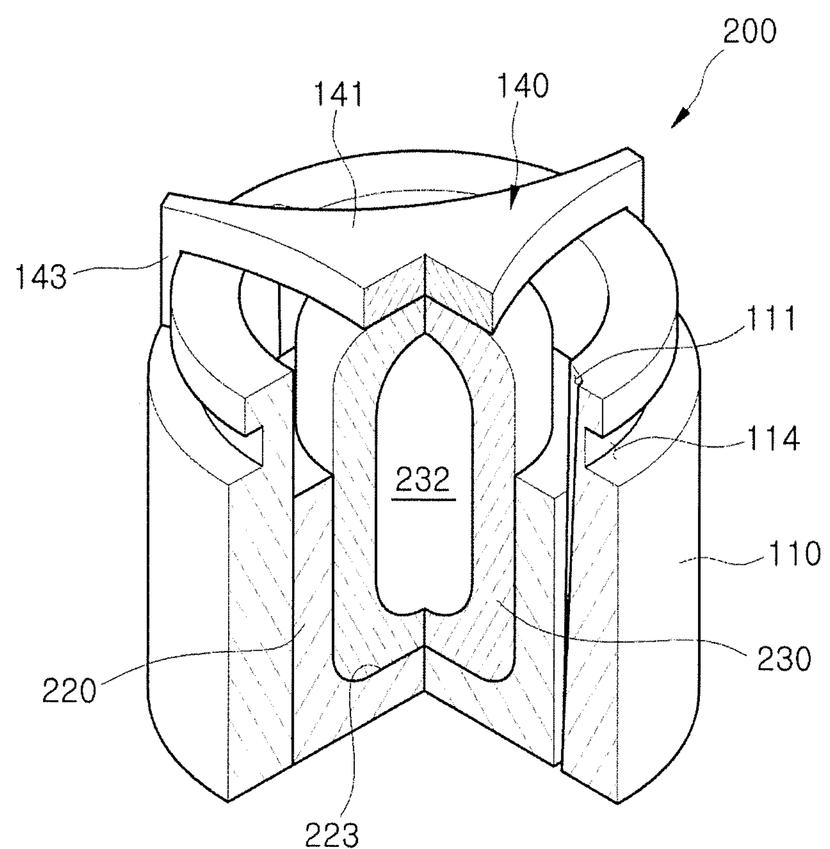

【Fig. 9】
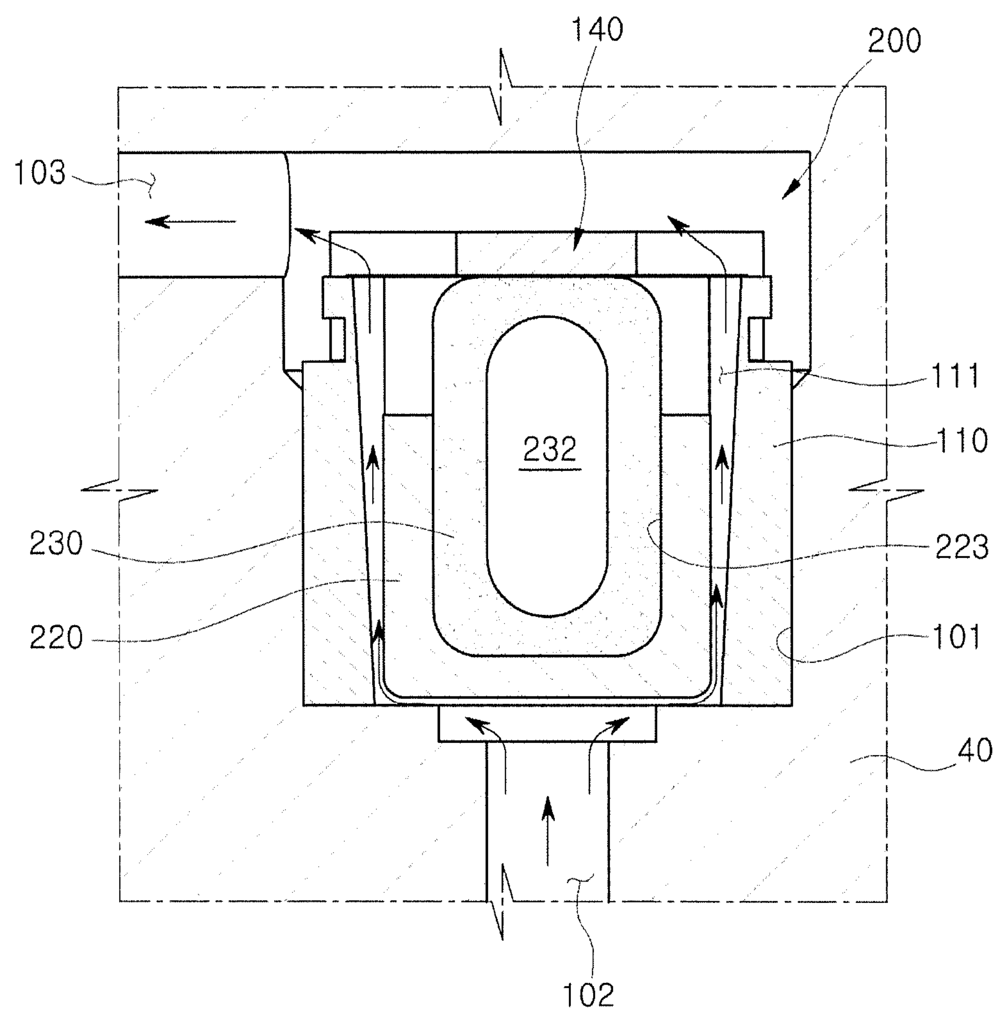

【Fig. 10】
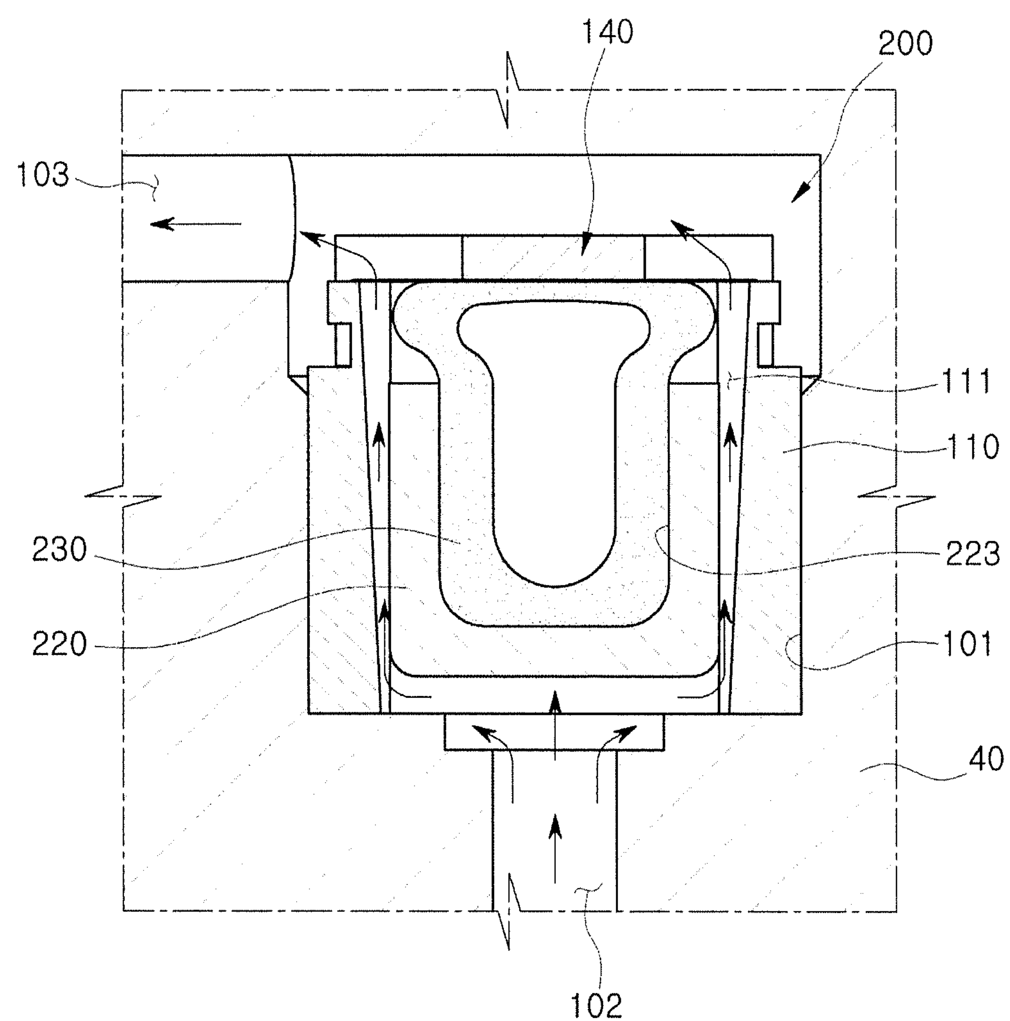

HYDRAULIC BRAKE SYSTEM

This application claims the benefit of Korean Patent Application No. 2015-0139550, filed on Oct. 5, 2015 in the Korean Intellectual Property Office, the disclosure of which is incorporated herein by reference.

BACKGROUND

1. Field

Embodiments of the present disclosure relate to a hydraulic brake system, and more particularly, to a hydraulic brake system capable of attenuating pressure pulsation of brake oil discharged from a pump and also reducing operation noise.

2. Description of the Related Art

Generally, to control braking hydraulic pressure delivered to a brake of a vehicle, an electric brake system includes a plurality of solenoid valves disposed at a modulator block, a low pressure accumulator and a high pressure accumulator which temporarily store oil, a pump disposed between the low pressure accumulator and the high pressure accumulator to pump the oil stored in the low pressure accumulator, a motor provided to drive the pump, and an electronic control unit (ECU) controlling these components which electrically operate.

Such an electric brake system has been used by employing a variety of structures in which the high pressure accumulator having a predetermined damping space is provided to reduce pressure pulsation generated as hydraulic pressure of brake oil discharged from the pump is formed in a high pressure and an orifice is provided at an outport discharged through the high pressure accumulator. Here, the high pressure accumulator is provided in a hydraulic brake system so as to attenuate pressure pulsation, and may be referred to as a pulsation reducing device or a damping device and will be referred to herein below as a damping device.

Such a damping device is used by providing a separate orifice to attenuate pressure pulsation. That is, the damping device is configured such that an orifice is necessarily manufactured or installed at an outport discharged through the damping device to attenuate pressure pulsation.

However, because the orifice should be separately manufactured or assembled as described above, there are problems in that an additional time is increased to manufacture and assemble the orifice and also manufacturing costs are increased, for providing the orifice in the damping device.

Also, a damping device should be designed based on an amount of discharging capacity to attenuate pressure pulsation due to an abrupt flow variation caused by discharging and suctioning operations according to pumping of a pump, but a damping device provided at a conventional hydraulic brake system is configured for the purpose of simply attenuating pressure pulsation so that there is a problem in that it is difficult to obtain an efficient attenuation effect of pressure pulsation.

SUMMARY

Therefore, it is an aspect of the present disclosure to provide a hydraulic brake system capable of reducing manufacturing and assembling time required to additionally install an orifice at a modulator block by integrally forming a variable orifice at a damping device that attenuates pressure pulsation, and also minimizing an amount of capacity discharged from a pump and pressure pulsation due to an abrupt flow variation and reducing noise by improving a structure of the damping device.

Additional aspects of the disclosure will be set forth in part in the description which follows and, in part, will be obvious from the description, or may be learned by practice of the disclosure.

In accordance with one aspect of the present disclosure, a hydraulic brake system comprising: a damping device configured to attenuate pressure pulsation of brake oil discharged according to a driving of a pump, wherein the damping device includes: a sleeve fixed to a bore that is connected to a discharge end of the pump and having an opened one side; a damping piston slidably installed inside the sleeve; and an elastic member provided inside the sleeve and configured to elastically support the damping piston, and wherein a slot having a width which is varied is formed at an inner circumferential surface of the sleeve in a direction in which the brake oil flows so that a variable orifice is formed between the damping piston and the sleeve.

Also, a cross-sectional area of the variable orifice at which the brake oil passes through is gradually increased toward a direction in which the brake oil is discharged.

Also, the damping piston is provided to be moved to pressurize the elastic member when hydraulic pressure of the brake oil discharged from the pump is equal to or greater than a predetermined pressure.

Also, the damping piston includes a flange having an outer circumferential surface at one side thereof, which is moved along the inner circumferential surface of the sleeve.

Also, the damping piston is provided in a cylindrical shape and with a flange protruding at one side of the cylindrical shape, and the elastic member is provided at an outward side of the cylindrical shape and one side of the elastic member is supported at the flange.

Also, the elastic member is configured with a damping spring of a coil shape.

Also, the elastic member is configured with a damping tube at which a damping space is formed thereinside.

Also, the damping tube is configured with a rubber material to be elastically deformed by pressurization of the damping piston.

Also, the hydraulic brake system further comprises a first stopper coupled to the opened one side of the sleeve and configured to support the elastic member and limit a movement distance of the damping piston.

Also, a first coupling depression is formed at an outer circumferential surface of the sleeve, and the first stopper includes: a body configured to expose a portion of an opened aperture of the sleeve; and a plurality of rods formed to be bended and to extend from the body to be coupled to the first coupling depression.

Also, the first coupling depression is configured with a circular depression formed along the outer circumferential surface of the sleeve, and each of the plurality of rods is provided with a coupling protrusion that is bended toward the first coupling depression to be fit thereinto.

Also, the hydraulic brake system further comprises a first stopper coupled to the opened one side of the sleeve to limit a movement distance of the damping piston, wherein one side of the elastic member is supported at the flange and the other end of the elastic member is supported at the first stopper, and an end portion of the cylindrical shape of the damping piston is disposed to be spaced apart from the first stopper.

Also, the sleeve is provided to have an opened one side, and the hydraulic brake system further includes: a second stopper coupled to the other side of the sleeve and configured to support the damping piston and limit a movement distance thereof.

Also, a second coupling depression is formed at an outer circumferential surface of the sleeve, and the second stopper includes: a body configured to expose a portion of an opened aperture of the sleeve; and a plurality of rods formed to be bended and to extend from the body to be coupled to the second coupling depression.

In accordance with other aspect of the present disclosure, a hydraulic brake system comprising: a first hydraulic circuit configured to connect a first port of a master cylinder to a first wheel cylinder to control delivery of hydraulic pressure; a second hydraulic circuit configured to connect a second port of the master cylinder to a second wheel cylinder to control delivery of hydraulic pressure; a pump configured to suction brake oil from the master cylinder and pump the suctioned brake oil; a main flow path configured to connect a discharge outlet of the pump to the master cylinder; an auxiliary flow path configured to guide the brake oil to an inlet of the pump to enable the brake oil to be suctioned; and a damping device installed at the main flow path and configured to attenuate pressure pulsation of the brake oil discharged according to a driving of the pump, wherein the damping device includes: a sleeve fixed to a bore that is connected to a discharge end of the pump and having an opened one side; a damping piston slidably installed inside the sleeve; and an elastic member provided inside the sleeve and configured to elastically support the damping piston, and wherein a slot having a width that is varied in a direction in which the brake oil flows is formed at an inner circumferential surface of the sleeve to form a variable orifice between the damping piston and the sleeve.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is an exploded perspective view of a damping device provided at a hydraulic brake system according to one preferred embodiment of the present disclosure.

FIG. 3 is a partially dissected perspective view of the damping device being assembled of FIG. 2.

FIGS. 4 and 5 are cross-sectional views illustrating a state in which pressure pulsation is attenuated through the damping device provided at the hydraulic brake system, respectively.

FIG. 6 is a graph showing an attenuation of an abrupt flow variation during a pumping operation of a pump driven by a damping device of a hydraulic brake system according to an embodiment.

FIG. 7 is a cross-sectional view illustrating a damping device provided in a hydraulic brake system according to another preferred embodiment of the present disclosure.

FIG. 8 is a partially dissected perspective view illustrating a damping device provided in a hydraulic brake system according to still another preferred embodiment according to the present disclosure.

FIGS. 9 and 10 are cross-sectional views illustrating a state in which pressure pulsation is attenuated through the damping device according to still another embodiment of the present disclosure, respectively.

DETAILED DESCRIPTION

Figure 1:
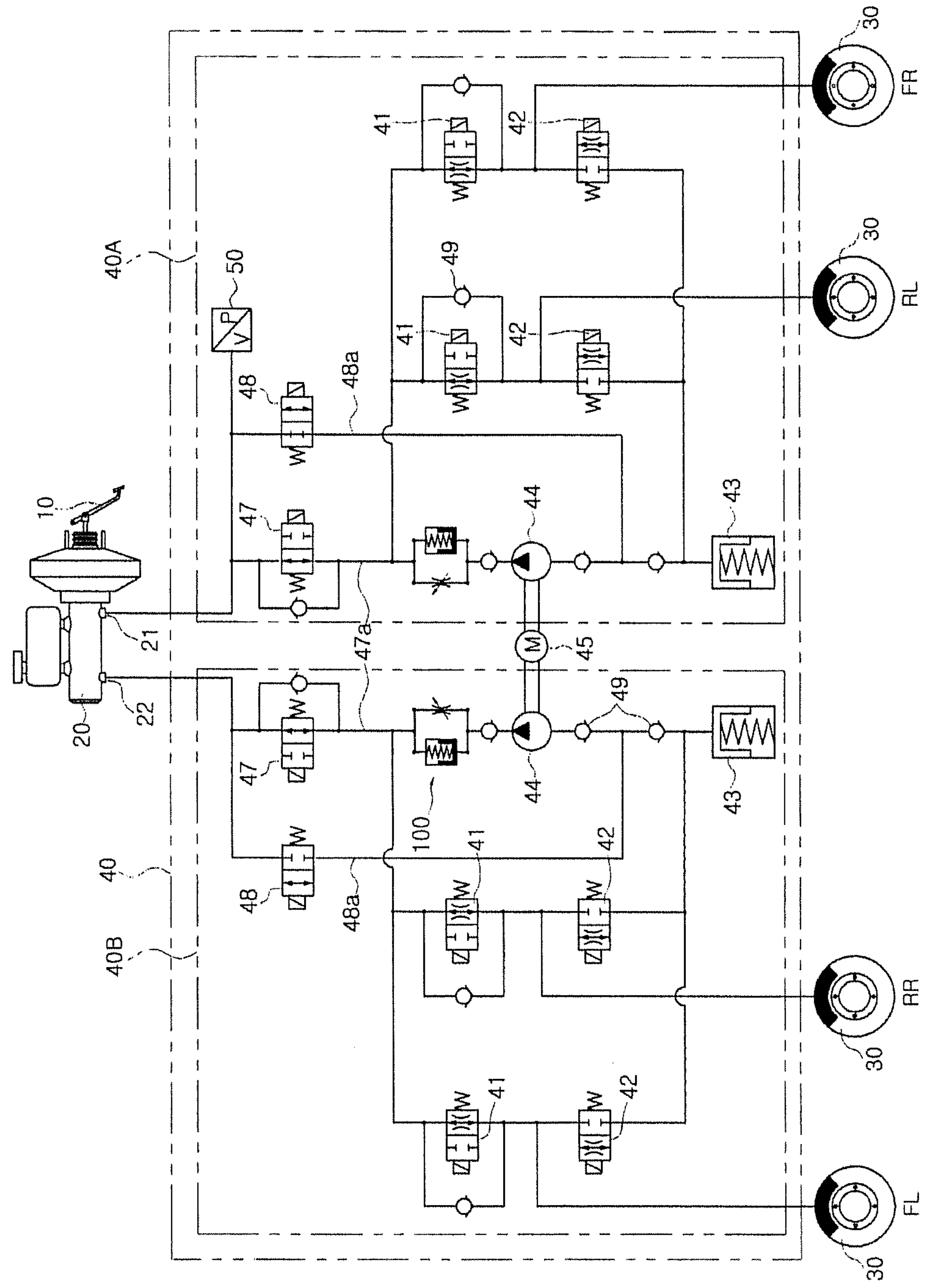
FIG. 1 is a schematic hydraulic circuit diagram of a hydraulic brake system according to one preferred embodiment of the present disclosure.

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a schematic hydraulic circuit diagram of a hydraulic brake system according to one preferred embodiment of the present disclosure.

Referring to FIG. 1, the hydraulic brake system includes a brake pedal 10 receiving a manipulation force of a driver, a brake booster 11 boosting a pedal effort of the brake pedal 10 using a pressure difference between vacuum pressure and atmospheric pressure, a master cylinder 20 generating pressure by means of the brake booster 11, a first hydraulic circuit 40A connecting a first port 21 of the master cylinder 20 to wheel cylinders 30 provided at two wheels FR and RL to control deliver of hydraulic pressure, and a second hydraulic circuit 40B connecting a second port 22 of the master cylinder 20 to wheel cylinders 30 provided at the remaining two wheels FL and RR to control deliver of hydraulic pressure. The first hydraulic circuit 40A and the second hydraulic circuit 40B are installed at a modulator block 40 in a compact size.

Each of the first hydraulic circuit 40A and the second hydraulic circuit 40B includes solenoid valves 41 and 42 controlling braking hydraulic pressure delivered to the two wheel cylinders 30, a pump 44 suctioning and pumping brake oil flowing from the wheel cylinders 30 or from the master cylinder 20 by means of a driving of a motor 45, a low pressure accumulator 43 temporarily storing brake oil flowing from the wheel cylinders 30, a main flow path 47*a* connecting a discharging outlet of the pump 44 to the master cylinder 20, an auxiliary flow path 48*a* guiding brake oil of the master cylinder 20 to an inlet of the pump 44 so as to enable the brake oil to be suctioned, and an electronic control unit (ECU) (not shown) controlling operations of the solenoid valves 41 and 42 and the motor 45.

At this point, as shown in the drawing, the solenoid valves 41 and 42, the low pressure accumulator 43, the pump 44, the main flow path 47*a*, and the auxiliary flow path 48*a* are provided at each of the first and second hydraulic circuits 40A and 40B.

More particularly, the plurality of solenoid valves 41 and 42 are connected to an upstream side and a downstream side of the wheel cylinders 30, and they are classified into normally opened type solenoid valves 41 that are disposed at the upstream side of each of the wheel cylinders 30 and are usually opened, and normally closed type solenoid valves 42 that are disposed at the downstream side of each of the wheel cylinders 30 and are usually closed. Opening and closing operations of such solenoid valves 41 and 42 may be controlled by the ECU (not shown), and the normally closed type solenoid valves 42 are opened according to decompression braking and thus brake oil flowing from the wheel cylinders 30 is temporarily stored in the low pressure accumulator 43.

The pump 44 is driven by the motor 45 to suction and discharge the brake oil stored in the low pressure accumulator 43 so that hydraulic pressure is delivered to the wheel cylinders 30 or the master cylinder 20.

Also, a normally opened type solenoid valve 47 (hereinafter, referred to as a TC valve) for a traction control system (TCS) is installed at the main flow path 47*a* connecting the master cylinder 20 to the discharging outlet of the pump 44. This TC valve 47 is usually maintained in an opened state, and delivers braking hydraulic pressure formed in the master cylinder 20 to the wheel cylinders 30 through the main flow path 47*a* in a general braking situation through the brake pedal 10.

Also, the auxiliary flow path 48*a* branches from the main flow path 47*a* to guide the brake oil of the master cylinder 20 to the inlet of the pump 44 and enable the brake oil to be suctioned thereto, and a shuttle valve 48 is installed at the auxiliary flow path 48*a* to flow the brake oil only to the inlet of the pump 44. The shuttle valve 48, which is electrically operated, is installed at the middle of the auxiliary flow path 48*a*, and is operated to be usually closed and to be opened in a TCS mode.

Meanwhile, an undescribed reference number '49' is a check valve that is installed at an appropriate position of a flow path to prevent a backflowing of the brake oil, and an undescribed reference number '50' is a pressure sensor that senses braking pressure delivered to the TC valve 47 and the shuttle valve 48.

When the above described hydraulic brake system operates a braking operation, pressure pulsation is generated from hydraulic pressure pumped from the pump 44 according to an operation of the motor 45. Therefore, in accordance with one embodiment of the present disclosure, a damping device 100 connected to the discharging outlet of the pump 44 of each of the hydraulic circuits 40A and 40B is provided to attenuate the pressure pulsation.

FIG. 2 is an exploded perspective view of a damping device provided at a hydraulic brake system according to one preferred embodiment of the present disclosure, FIG. 3 is a partially dissected perspective view of the damping device being assembled of FIG. 2, and FIGS. 4 and 5 are cross-sectional views illustrating a state in which pressure pulsation is attenuated through the damping device provided at the hydraulic brake system, respectively. And FIG. 6 is a graph showing an attenuation of an abrupt flow variation during a pumping operation of a pump driven by a damping device of a hydraulic brake system according to an embodiment.

Referring to FIGS. 2 and 5, the damping device 100 according to one embodiment of the present disclosure is provided at a bore 101 that communicates with an inport 102 at which brake oil discharged from a pump (see '44' of FIG. 1) flows in and an outport 103 at which the brake oil flows out. At this point, the damping device 100 is provided at a main flow path (see, '47*a*' of FIG. 1), the inport 102 is connected to the main flow path 47*a* that is connected to a discharging end of the pump 44, and the outport 103 is connected to the main flow path 47*a* that is connected to the master cylinder 20. Such a damping device 100 includes a sleeve 110 installed at the bore 101, a damping piston 120 slidably provided inside the sleeve 110, an elastic member 130 providing an elastic force to the damping piston 120, and a stopper 140 coupled to the sleeve 110 to limit a movement distance of the damping piston 120.

The sleeve 110 is configured in a cylindrical shape which has an opened upper portion and an opened lower portion, and is press-inserted into and fixed to the bore 101. A slot 111 is formed at an inner circumferential surface of such a sleeve 110 in a length direction thereof, that is, in a direction in which the brake oil flows. At this point, the slot 111 is formed to be varied in width, and the width thereof is formed to be increased toward a direction in which the brake oil is discharged. Such a slot 111 is formed to serve as an orifice that reduces pressure pulsation of the brake oil and guides a flow thereof, and is formed as a variable orifice 111, which will be described below, between the damping piston 120 and the sleeve 110.

Also, a coupling depression 114 is formed at an outer circumferential surface of the sleeve 110. The coupling depression 114 is formed to couple to the stopper 140 which will be described below, and it will be described again below.

The damping piston 120 is elastically supported by the elastic member 130 and is slidably installed inside the sleeve 110. The damping piston 120 is pressurized to be moved by means of hydraulic pressure discharged from the pump (see, '44' of FIG. 1). As shown in the drawing, the damping piston 120 is disposed at a lower side of the sleeve 110 at which the inport 102 is located and the brake oil discharged from the pump 44 flows in the inport 102, and is formed in a stepped shape. That is, the damping piston 120 includes a flange 123 that has an outer circumferential surface at one side thereof, which comes into contact with the inner circumferential surface of the sleeve 110. The flange 123 comes into close contact with the inner circumferential surface of the sleeve 110 to form the slot 111 as the variable orifice 111 and serve to support the elastic member 130 which will be described below. When such a damping piston 120 is moved to an upper side to pressurize the elastic member 130, a cross-sectional area at which the brake oil passes through the variable orifice 111 is increased.

The elastic member 130 is configured with a damping spring 130 of a coil shape to provide an elastic force to the damping piston 120. One end of the damping spring 130 is supported at the flange 123 of the damping piston 120, and the other end thereof is supported by the stopper 140 which will be described below.

The above described damping piston 120 is provided in a state in which it is elastically supported by the damping spring 130 so that it is moved to pressurize the damping spring 130 when hydraulic pressure of the brake oil discharged from the pump 44 is equal to or greater than a predetermined pressure. For example, as shown in FIG. 4, the damping device 100 may reduce pressure pulsation through the variable orifice 111 even though the damping piston 120 is not moved when pressure of the brake oil discharged from the pump (see, '44' of FIG. 1) is low. That is, when hydraulic pressure of the brake oil is a low pressure, the damping piston 120 is not moved, pressure pulsation of the brake oil is reduced through the variable orifice 111, and the brake oil is discharged to the outport 103. Here, it could be understood that pressure of the brake oil being discharged is in proportion to an elastic force of the damping spring 130, and it should be understood that the pressure being discharged is a low pressure when it is less than the elastic force of the damping spring 130.

Meanwhile, as shown in FIG. 5, when the pressure of the brake oil discharged from the pump 44 is greater than the elastic force of the damping spring 130, the damping piston 120 slides to pressurize the damping spring 130 and varies a volume to reduce pressure pulsation. At this point, a cross-sectional area, at which the brake oil passes due to the movement of the damping piston 120 through the variable orifice 111 formed between the damping piston 120 and the sleeve 110, is increased.

The stopper 140 supports the damping spring 130 disposed inside the sleeve 110, and limits a movement distance of the damping piston 120. Such a stopper 140 is installed at each of upper and lower portions of the sleeve 110. More particularly, the stopper 140 includes a body 141 and a plurality of rods 143 that are integrally formed with the body 141 and mounted at the coupling depression 114 of the sleeve 110.

The body 141 has a cross-sectional area less than that of an opened aperture of the sleeve 110. The reason for that is that the brake oil flowing from the inport 102 could be discharged to the outport 103 through the variable orifice 111 formed at the sleeve 110. That is, the body 141 has a cross-sectional area less than that of an aperture formed at each of the upper and lower portions of the sleeve 110 so that a part not blocked by the body 141 becomes a flow path at which the brake oil flows.

The plurality of rods 143 are formed to be bended from the body 141. As shown in the drawing, the rods 143 are downwardly bended and extend from the body 141 toward the coupling depression 114 to be coupled to the coupling depression 114. Three rods 143 are shown in the drawing, but they are not limited thereto, and the number of the rods 143 may be increased or decreased as long as the rods 143 are coupled to the sleeve 110 and are not escaped therefrom. Meanwhile, a coupling protrusion 144 protruding to the coupling depression 114 and being fit therein is further provided at each of the rods 143. The coupling protrusion 144 includes a surface which has an inclined shape to facilitate a coupling of the stopper 140 and the sleeve 110 by sliding and moving the stopper 140.

Next, an operation of the above described damping device 100 attenuating pressure pulsation according to a pumping operation (a suctioning and a discharging) of the pump 44 will be described.

The pump 44 suctions and discharges the brake oil according to a reciprocal movement of a piston by means of an eccentric bearing installed at a rotating shaft of the motor 45. That is, the piston is provided to come into contact with the eccentric bearing and is reciprocally moved by means of eccentric rotation of the eccentric bearing. Suctioning and discharging operations of such a pump 44 are one cycle thereof when the eccentric bearing turns from 0° to 360°, and an abrupt flow variation occurs when the discharging operation is switched to the suctioning operation. In other words, as can be seen from a graph shown in FIG. 6A, a hydraulic brake system not provided with the damping device 100 could not attenuate an abrupt flow variation when the pump 44 performs a pumping operation.

In the hydraulic brake system provided with the damping device 100 according to one embodiment of the present disclosure, the damping piston 120 is moved to pressurize the damping spring 130 and cause an occurrence of volumetric variation, thereby attenuating pressure pulsation when the brake oil is discharged according to the pumping operation of the pump 44. At this point, the damping device 100 may have a constant amount of volume of a flow discharged from the pump 44 according to the movement of the damping piston 120 to attenuate an abrupt flow variation generated upon a pumping operation. That is, a half of the brake oil, which was discharged upon the discharging operation of the pump 44, is discharged as the damping piston 120 is operated to pressurize the damping spring 130, and the remaining half of the brake oil is discharged when the damping piston 120 is returned to its original position by means of the elastic force of the damping spring 130 upon the suctioning operation of the pump 44. In other words, as can be seen from a graph shown in FIG. 6B, the abrupt flow variation is attenuated when the pump 44 performs the pumping operation. Consequently, pressure pulsation and noise, which are caused by the brake oil of high pressure discharged from the pump 44, may be effectively minimized.

Meanwhile, the above described damping spring 130 has been shown and described to be supported at the flange 123 of the damping piston 120, but it is not limited thereto, and the damping spring 130 may be supported inside a damping piston 120' to provide an elastic force thereto. A damping device 100' having such a structure is shown in FIG. 7.

FIG. 7 is a cross-sectional view illustrating a damping device provided in a hydraulic brake system according to another preferred embodiment of the present disclosure. Here, a reference number the same as that in the above described drawing refers to a member serving the same function described above.

Referring to FIG. 7, the damping device 100' includes a sleeve 110 installed at a bore 101, the damping piston 120' slidably provided inside the sleeve 110, an elastic member 130 providing an elastic force to the damping piston 120', and a stopper 140 coupled to the sleeve 110 to limit a movement distance of the damping piston 120'.

According to the present embodiment, the damping piston 120' is provided to have a cylindrical shape which has an opened one side. That is, the damping piston 120' is provided in a cup shape in which an accommodating space 123' is formed. Therefore, the damping spring 130 provided in a coil shape is disposed in the accommodating space 123' to provide an elastic force to the damping piston 120'. The damping device 100' according to the present embodiment has the same structure of each component and the same operation thereof as those of the damping device 100 described in the above embodiment except an installation position of the damping spring 130 according to the shape of the damping piston 120', and thus a detailed description thereof will be omitted.

FIG. 8 is a partially dissected perspective view illustrating a damping device provided in a hydraulic brake system according to still another preferred embodiment according to the present disclosure, and FIGS. 9 and 10 are cross-sectional views illustrating a state in which pressure pulsation is attenuated through the damping device according to still another embodiment of the present disclosure, respectively. Here, a reference number the same as that in the drawing of one embodiment described above refers to a member serving the same function described above, and thus a description thereof will be omitted.

Referring to FIGS. 8 to 10, a damping device 200 includes a sleeve 110 installed at a bore 101 of a modulator block 40 and at which a variable orifice 111 is formed, a damping piston 220 slidably provided inside the sleeve 110, an elastic member 230 providing an elastic force to the damping piston 220, and a stopper 140 coupled to the sleeve 110 to limit a movement distance of the damping piston 220.

According to the present disclosure, the damping piston 220 is provided to have a cylindrical shape which has an opened one side. That is, the damping piston 220 is provided in a cup shape in which an accommodating space 223 is formed. As shown in the drawing, the elastic member 230 is provided as a damping tube 230 in which a damping space 232 is formed. The damping tube 230 is installed at the accommodating space 223 of the damping piston 220 and an upper portion of the damping tube 230 is supported by the stopper 140. Therefore, the damping tube 230 may be configured with a rubber material to be elastically deformed by means of pressurization of the damping piston 220.

Meanwhile, as shown in the drawing, the stopper 140 may be installed at only an upper side of the sleeve 110. That is, the stopper 140 is coupled to a coupling depression 114 formed at an upper portion of the sleeve 110 to support the damping tube 230 and limit a movement distance of the damping piston 220. The reason for that is that the damping piston 220 exposed to a lower aperture of the sleeve 110 is supported by the modulator block 40 at which the bore 101 is formed. Alternatively, the stopper 140 may be selectively installed at a lower side of the sleeve 110.

The damping device 200' having the above described structure may attenuate pressure pulsation through the variable orifice 111 when pressure of brake oil discharged from a pump (see, '44' of FIG. 1) is low. At this point, as shown in FIG. 9, the damping piston 220 is finely spaced apart from a bottom portion of the bore 101, and thus the brake oil is discharged to an outport 103 through the variable orifice 111 to attenuate pressure pulsation.

On the other hand, as shown in FIG. 10, when the pressure of the brake oil discharged from the pump 44 is greater, the damping piston 220 slides to compress the damping tube 230 and vary a volume so that pressure pulsation is reduced. At this point, the damping tube 230 is elastically deformed and also the damping space 232 thereinside alleviates impact so that pressure pulsation and noise may be effectively attenuated. Meanwhile, due to the movement of the damping piston 220, a cross-sectional area at which the brake oil passes through the variable orifice 111 formed between the damping piston 220 and the sleeve 110 is increased.

As is apparent from the above description, the hydraulic brake system according to one embodiment of the present disclosure is advantageous to reducing assembling and manufacturing time compared to those of a conventional hydraulic brake system by integrally forming and providing an orifice, which attenuates pressure pulsation, at a sleeve of a damping device to exclude a process of additionally installing the orifice at a modulator block.

Also, pulsation is reduced by means of only an orifice when hydraulic pressure discharged from a pump is a low pressure, and a damping piston is activated to minimize pressure pulsation when the hydraulic pressure discharged from the pump is a high pressure such that there are effects in which the pressure pulsation may be efficiently reduced and also noise may be reduced. Moreover, an unnecessary operation of the damping piston is not performed so that operation noise may be minimized.

Furthermore, an orifice is formed to have a variable cross-sectional area at which oil passes through to induce pressure variation through speed variation of brake oil so that there are effects in which pressure pulsation may be effectively reduced and operation noise may be reduced.

As described above, although the present disclosure has been described by way of a specific embodiment and the accompanying drawings, it is not limited thereto, and it should be understood that numerous other changes and modifications can be devised by those skilled in the art that will fall within the spirit and scope of this disclosure and along with the full range of equivalents to which the appended claims are entitled.

DESCRIPTION OF REFERENCE NUMERALS

100, 100', and 200: Damping Devices 110: Sleeve
111: Slot (Variable Orifice) 120, 120', and 220: Damping Pistons
130 and 230: Elastic Members 140: Stopper

What is claimed is:

1. A hydraulic brake system comprising:
a damping device configured to attenuate pressure pulsation of brake oil discharged according to a driving of a pump,
wherein the damping device includes:
a sleeve fixed to a bore that is connected to a discharge end of the pump and having an opened side;
a damping piston slidably installed inside the sleeve; and
an elastic member provided inside the sleeve and configured to elastically support the damping piston,
wherein a slot having a width which is varied is formed at an inner circumferential surface of the sleeve in a direction in which the brake oil flows so that a variable orifice is formed between the damping piston and the sleeve,
wherein the hydraulic brake system further comprises a first stopper coupled to the opened side of the sleeve, configured to support the elastic member, and configured to limit a movement distance of the damping piston,
wherein a first coupling depression is formed at an outer circumferential surface of the sleeve, and
wherein the first stopper includes:
a first body configured to expose a portion of an opened aperture of the sleeve; and
a plurality of first rods bended and extending from the first body to be coupled to the first coupling depression.

2. The hydraulic brake system of claim 1, wherein a cross-sectional area of the variable orifice at which the brake oil passes through is gradually increased toward a direction in which the brake oil is discharged.

3. The hydraulic brake system of claim 1, wherein the damping piston is provided to be moved to pressurize the elastic member when hydraulic pressure of the brake oil discharged from the pump is equal to or greater than a predetermined pressure.

4. The hydraulic brake system of claim 1, wherein the damping piston includes a flange having an outer circumferential surface at one side thereof, which is moved along the inner circumferential surface of the sleeve.

5. The hydraulic brake system of claim 1, wherein the damping piston is provided in a cylindrical shape and with a flange protruding at one side of the cylindrical shape, and the elastic member is provided at an outward side of the cylindrical shape and one side of the elastic member is supported at the flange.

6. The hydraulic brake system of claim 1, wherein the elastic member is configured with a damping spring of a coil shape.

7. The hydraulic brake system of claim 1, wherein the elastic member is configured with a damping tube at which a damping space is formed thereinside.

8. The hydraulic brake system of claim 7, wherein the damping tube is configured with a rubber material to be elastically deformed by pressurization of the damping piston.

9. The hydraulic brake system of claim 1, wherein the first coupling depression is configured with a circular depression formed along the outer circumferential surface of the sleeve, and each of the plurality of first rods is provided with a coupling protrusion that is bended toward the first coupling depression to be fit thereinto.

10. The hydraulic brake system of claim 1, wherein the sleeve has another opened side, and the hydraulic brake system further includes:

a second stopper coupled to the other opened side of the sleeve and configured to support the damping piston and limit the movement distance thereof.

11. The hydraulic brake system of claim 10, wherein a second coupling depression is formed at another outer circumferential surface of the sleeve, and the second stopper includes:

a second body configured to expose a portion of another opened aperture of the sleeve; and a plurality of second rods formed to be bended and to extend from the second body to be coupled to the second coupling depression.

12. A hydraulic brake system comprising:

a first hydraulic circuit configured to connect a first port of a master cylinder to a first wheel cylinder to control delivery of hydraulic pressure;

a second hydraulic circuit configured to connect a second port of the master cylinder to a second wheel cylinder to control delivery of hydraulic pressure;

a pump configured to suction brake oil from the master cylinder and pump the suctioned brake oil;

a main flow path configured to connect a discharge outlet of the pump to the master cylinder;

an auxiliary flow path configured to guide the brake oil to an inlet of the pump to enable the brake oil to be suctioned; and a damping device installed at the main flow path and configured to attenuate pressure pulsation of the brake oil discharged according to a driving of the pump, wherein the damping device includes:

a sleeve fixed to a bore that is connected to a discharge end of the pump and having an opened side;

a damping piston slidably installed inside the sleeve; and an elastic member provided inside the sleeve and configured to elastically support the damping piston, wherein a slot having a width that is varied in a direction in which the brake oil flows is formed at an inner circumferential surface of the sleeve to form a variable orifice between the damping piston and the sleeve, wherein the hydraulic brake system further comprises a stopper coupled to the opened side of the sleeve, configured to support the elastic member, and configured to limit a movement distance of the damping piston, wherein a coupling depression is formed at an outer circumferential surface of the sleeve, and wherein the stopper includes:

a body configured to expose a portion of an opened aperture of the sleeve; and a plurality of rods bended and extending from the body to be coupled to the coupling depression.

13. A hydraulic brake system comprising:

a damping device configured to attenuate pressure pulsation of brake oil discharged according to a driving of a pump, wherein the damping device includes:

a sleeve fixed to a bore that is connected to a discharge end of the pump and having an opened side;

a damping piston slidably installed inside the sleeve; and an elastic member provided inside the sleeve and configured to elastically support the damping piston, and wherein a slot having a width which is varied is formed at an inner circumferential surface of the sleeve in a direction in which the brake oil flows so that a variable orifice is formed between the damping piston and the sleeve, wherein the damping piston, which has a cylindrical shape, includes a flange protruding at one side of the damping piston, and the elastic member is provided at an outward side of the damping piston so that one side of the elastic member is supported at the flange, wherein the hydraulic brake system further comprising a stopper coupled to the opened side of the sleeve to limit a movement distance of the damping piston, wherein one end of the elastic member is supported at the flange and another end of the elastic member is supported at the stopper, and wherein an end portion of the cylindrical shape of the damping piston is spaced apart from the stopper.

* * * * *